United States Patent Office 3,277,048
Patented Oct. 4, 1966

3,277,048
THERMOPLASTIC FIRE-RETARDANT, HIGH-POLYMER, EPOXIDE RESIN COMPOSITION
Lawrence F. Sonnabend, Midland, Mich., assignor to The Dow Chemical Company, Midland, Mich., a corporation of Delaware
No Drawing. Filed Jan. 16, 1961, Ser. No. 82,711
8 Claims. (Cl. 260—47)

The invention relates to an improved resin which employs an epoxide or oxirane-containing compound in the preparation thereof. It more particularly refers to such resin which possesses substantially all the desirable properties for practical purposes which are normally associated with the class of resins known a epoxy resins but which is thermoplastic, which can be molded by thermoplastic molding techniques, and which has improved fire-retardant properties, and to the method of making such resin.

The resin of the invention employs a diepoxide, i.e., (1) a compound containing substantially two oxirane groups per molecule and (2) a phenolic compound, at least one of which reactants contains halogen atoms attached directly to carbon atoms of an aromatic ring. The term oxirane denotes a structure containing the ether linkage wherein oxygen is bonded to two carbon atoms to complete a ring. The halogen may be any of the four elements so classed. However, fluorine is considered, generally, insufficiently effective as a fire-retardant substituent in the invention, and iodine, on the other hand, is considered, generally, insufficiently stable, in the practice of the invention. The recommended halogens, therefore, in a practical sense, for use in the invention are bromine and chlorine.

Known epoxy resins, in general, are prepared by (1) reacting an epoxide, e.g., epichlorohydrin, with a di- or polyhydric phenol or alcohol, e.g., 4,4′-isopropylidenediphenol, usually referred to by its trivial name of bisphenol A, in the presence of an epoxidizing agent, e.g., NaOH, in a molar excess over the hydroxyl groups or (2) the epoxidation of a diolefin by an oxidizing agent, e.g., epoxidation of butadiene by peracetic acid.

The product, made by either of the above methods, is an epoxy resin intermediate or uncured epoxy resin. Dependent upon the molar excess of epoxide over the alcohol or phenol, the resin is either a viscous liquid or an extremely brittle low-melting solid, either of which must be subsequently cured by admixture therewith of a hardening agent, usually comprising an amine, an aminated polyoxyalkalene glycol, a carboxylic acid, a carboxylic acid anhydride, a quaternary ammonium salt, or a boron trifluoride-amine complex, and curing at a temperature which is usually somewhat above room temperature for an appreciable number of hours. The epoxy resin is thereby converted to a thermosetting resin.

Known epoxy intermediates have little direct use in the uncured state where strength properties are required. Their principal use is an intermediate resin which is admixed with a hardening agent and subsequently cured, as aforesaid. Curing of such epoxy intermediates entails a number of disadvantages among which are greater inconvenience and increased production and equipment costs. A further undesirable condition accompanying the use of such widely used hardening agents as amines is their inherent toxicity which is detrimental to the health and convenience of personnel concerned with the curing operation.

The invention provides a resin of excellent strength properties, adapted to injection molding, and possessing marked safety features in regard to fire hazards.

The invention is a thermoplastic epoxy resin not requiring the employment of any subsequent curing period nor agent. It has a high molecular weight of not less than about 30,000 and usually between 50,000 and 70,000. It has excellent physical properties which make it particularly suitable for a large number of uses. Among such physical properties are high tensile strength, percent elongation, modulus, flexural strength, impact resistance, dielectric, and electrical properties. It is long-wearing and possesses high abrasion resistance. Long exposure to moisture, chemicals, sun, and heat at temperatures below its softening point (subsequently described) have shown it to resist cracking, checking, flaking, or softening. It has a softening temperature of not less than about 90° C. and usually not less than 100° C. as determined by the Deflection Temperature of Plastics Under Load, A.S.T.M. Test No. D 648–56. It is particularly adapted to injection molding whereas conventional thermosetting epoxy resins cannot be employed for injection molding. It is fire-retardant and, when prepared according to the preferred embodiment of the invention, is self extinguishing as defined in the Test for Flammability of Rigid Plastics, A.S.T.M. Test No. D 635–56T.

The moldable or deformable composition of the invention is a high molecular weight composition which consists essentially of the reaction product formed by heating for at least 0.25 hour, at at least 165° C., (1) a diepoxide ether prepared by reacting an epichlohydrin with an hydroxy compound selected from the class consisting of dihydric alcohols, dihydric phenols and bisphenols, and halogenated dihydric alcohols, dihydric phenols and bisphenols (2) a bisphenolic compound selected from the class consisting of bisphenols and halogenated bisphenols, in a molar ratio which provides between 0.95 and 1.05 oxirane groups in said diepoxide per hydroxyl group in said bisphenol, and at least 1 of said diepoxides or bisphenols containing halogen atoms attached directly to carbon atoms of the aromatic nucleus in an amount sufficient to provide the necessary percent of halogen in the composition to render said composition self extinguishing as defined in A.S.T.M. Test No. D 635–56T and (3) a tertiary amine catalyst in an amount sufficient to provide at least 0.02 percent amine nitrogen (calculated as $NR_3$, where R is a hydrocarbon group consisting of at least 2 carbon atoms) by weight of said composition. When bromine is the halogen, the final resin product must consist of at least 10.5 percent by weight of bromine and when chlorine is the halogen, the final product must consist of at least 19 percent by weight of chlorine to be self extinguishing.

The tertiary amine employed may be alkyl, alkaryl, aralkyl, and aryl, the alkyl amines being preferred. It is also preferred that at least one of the alkyl substituents contain at least 2 carbon atoms. Illustrative of the amines employed are triethylamine and the isomers of tripropyl, tributyl, triamyl, and trihexyl amine diethylpropyl amine, and combinations and mixtures thereof wherein at least one alkyl group contains at least 2 carbon atoms. The trihexyl amine is especially effective in the practice of the invention. Trialkyl amines, wherein the alkyl groups consist of more than 6 carbon atoms, although not generally economically available, may be used in the practice of the invention. The amount of amine nitrogen required seldom exceeds 0.1 percent by weight of said composition, although greater amounts may be employed with no apparent adverse effects. For easy calculation, tertiary amines having 2 to 6 carbon atoms in each alkyl substituent are usually employed in an amount between 0.1 and 2.0 percent by weight of the resulting composition. Analysis of the nitrogen content of the tertiary amines, removed after the reaction, have shown that substantially all the amines may be removed thereby showing the catalytic nature of the amine, rather than a curing agent in the reaction.

After said reaction period, the resulting product is cooled to produce the hard semi-rigid composition of the invention. It is a thermoplastic, fire retardant, flexible, high molecular weight polymer showing relatively high tensile strength and percent elongation values and a softening point above 90° C., as determined by A.S.T.M. Test D 648–56T. The heating period is best described as a reaction period rather than a cure in its customary sense. The amine serves as a catalyst and not as a cross-linking reactant. When the lower alkyl tertiary amines are employed, a substantial portion of the amine catalyst volatilizes away during the reaction period. When the higher alkyl tertiary amines, say on the order of 5 or 6 carbon atoms or more are employed, a substantial portion of the unreacted amine catalyst remains in the final product. No undesirable effects have been observed to exist due to the presence of the residual unreacted higher amine. It is recommended that the lower alkyl amines be largely removed while the resin is deformable since their presence as a gas sometimes produces bubbles or voids in the finished resin. It is not recommended that the reaction take place at a temperature greater than about 240° C., the temperature usually employed being between 190° and 220° C. A reaction period within this preferred temperature of longer than 0.25 hour produces little change in the product and a period beyond 0.5 hour at these temperatures gives no noticeable improvement. Tests conducted on three otherwise identical resin compositions of the invention prepared at a reaction temperature of about 215° C., one of which has been kept at the reaction temperature for 0.5 hour, another 1 hour, and still another for 24 hours, and subsequently cooled, showed no significant measurable differences in physical properties.

The compound while still deformable may be conveniently employed in a laminating, coating, impregnating, encapsulating, potting, or embedding operation; it may be extruded in the shape of tubes, bars, rods, or as strands, the strands upon solidifying being suitable for weaving into fabric; it may be pressure molded or otherwise formed into any shape for which an appropriate mold or shaping equipment is obtainable. It is especially useful for making resinous articles and materials which may be subjected to flame or high temperature. It may be cast into convenient size shapes or into convenient strands, which upon being cooled below the softening point are subsequently broken into bits or particles as by means of a suitable crusher or grinder, and the thus pulverized or particulated resin subsequently employed as molding powder or granules according to conventional practice employing thermoplastic resins. If it is desired to reshape an article made of the resin of the invention, it may be reheated above its softening temperature and reshaped.

A particular advantage of the resin of the invention is the relatively short reaction period required to convert it to the useful finished semi-rigid material described above without additional treatment. Area or space requirements, labor costs, and handling equipment needs are reduced to an unprecedented low level for a resin which possesses physical strength properties comparable to thermosetting resins plus added flame retardant and injection molding properties.

The composition of the invention may be prepared in mass, i.e., without the use of a solvent, or a substantially inert liquid reaction medium may be employed to provide a solvent system. The composition may be produced either batchwise or by continuous operation.

According to the preferred batchwise mode of preparation, the epoxide and the phenolic compound are admixed in a reaction vessel provided with heat control and agitation means. A solvent is usually employed to decrease the viscosity but is not necessary, e.g., in small batch operations. The vessel is preferably covered and equipped with a lead-in pipe, connected to a substantially inert gas source, usually nitrogen. The epoxide ether and phenolic mixture is usually premixed by heating to between about 115° and 160° C. and held at that temperature accompanied by stirring until a substantially uniform mixture is obtained. It is then cooled to between 85° and 115° C., usually about 100° C., and the tertiary amine admixed therewith. After the amine is mixed into the reaction mixture, the temperature is then raised to at least about 165° C. and held at between 165° C. and 240° C., preferably at between 190° and 230° C. for 1 hour. Longer times appear not to be detrimental but also not to result in an improved product. The resin thus formed may be then applied for laminating, impregnating, or the like, or it may be molded or otherwise formed into desired shapes as above suggested. If a solvent is employed in the batch operation, it is recommended that the resin, prior to cooling and preferably at an advanced temperature of between 220° and 160° C., be subjected to a volatilizing step to remove the solvent. Upon cooling the resin to below its softening temperature, a hard durable resinous coating or film, cast article, or material to be particulated and used for compression or injection molding, is thus produced.

In the preferred continuous mode of operation, which is generally more efficient and convenient than the batchwise mode of making the resin of the invention, a suitable organic solvent, e.g., toluene, benzene, xylene, or a ketone, is usually fed into a pre-mixing vessel provided with stirrer, heat control means, suitable temperature-recording instruments, and flow control means for introducing reactants, and solvent, all of which are usually located near the top of the vessel, and a controlled discharge means for removing the premix, located at the bottom of the vessel. A solvent, similarly as in the batchwise mode of operation, is not necessary but has been found to facilitate stirring and transfer of the reaction mixture. The epoxide and the phenolic compound, in amounts sufficient to provide substantially the equivalent number of each of the oxirane groups and phenolic hydroxyl groups, are fed into the vessel. The solvent is usually employed in an amount of about 20 to 50 percent by weight of the total charge. The contents are stirred and heated to a temperature at which the reaction mixture is substantially homogeneous. When an appropriate solvent is employed, this temperature is lower than is permissible in a no-solvent system. The temperature employed, therefore, is dependent in part upon the efficacy and concentration of the solvent. The temperature is usually not over about 100° C. This step is largely a mixing and preheating step and the time is not highly critical. The tertiary amine may be added directly into the premix. However, it is preferably admixed with the outgoing premix.

The discharge from the mixing vessel leads either into an intermediate reaction vessel at between about 85° and 115° C. and then into heated tubes or directly into a separate reaction vessel, either of which is usually maintained at a temperature of between about 180° and 240° C. The intermediate heating step is not necessary, and if preferred, the premixture may be subjected at once to the higher temperature. The reaction mixture remains in the tubes or vessel for at least 0.5 hour, although 15 minutes is usually ample. On the other hand, for convenience, the reaction mixture may be allowed to remain in the heated tubes or vessel for 8–10 or more hours. It is then led into a vented vessel maintained at a temperature of between about 180° and 260° C. (usually between about 225° and 240° C.) where the solvent is volatilized off when used, and the more volatile amines are also largely volatilized off. Thereafter the resin may be drawn therefrom, while still above its softening temperature, into suitable molds, an extruder chamber, onto film-forming rollers, or onto a material to be coated, impregnated, or the like, and the thus formed or spread resin allowed to cool. However, it is preferably drawn off through one or more orifices and subsequently cooled to form convenient shaped strands or the like for use, as such, or for subsequently chopping or crushing for use as molding granules.

The epoxide used in the preparation of the composition of the invention, as aforesaid, is the diglycidyl ether of a dihydric alcohol or dihydric phenol or of such phenol wherein bromine or chlorine is substituted on the carbon atoms of the phenolic ring. However, when the epoxide does not contain halo-substituted phenolic rings, then the phenolic compound must consist of a dihydric phenol wherein bromine or chlorine is substituted on the carbon atoms of the phenolic ring to provide the necessary bromine or chlorine content in the end product.

The chemical action thought to take place wherein the diepoxide is a diglycidyl ether of a bisphenol may be represented by the following equation:

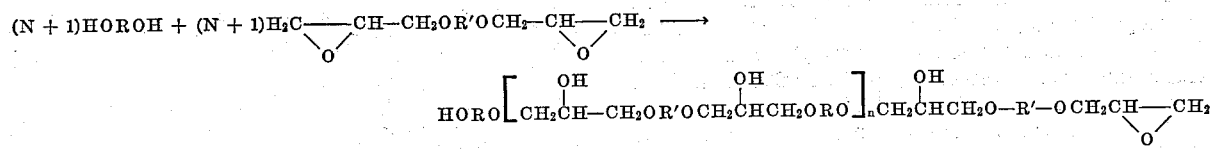

where R is the aryl residue of the phenolic compound and R' is the aryl residue of the diglycidyl ether and $n$ is about 60 or more.

R or R' may be the same but usually only one is chlorinated or brominated. In practice the phenolic compound is most often chlorinated or brominated and the diglycidyl ether is a low molecular weight substantially pure diglycidyl ether of a bisphenol since such materials are readily available.

Illustrative of R and R', the repeating aryl groups in the product represented in the above equation, are the following:

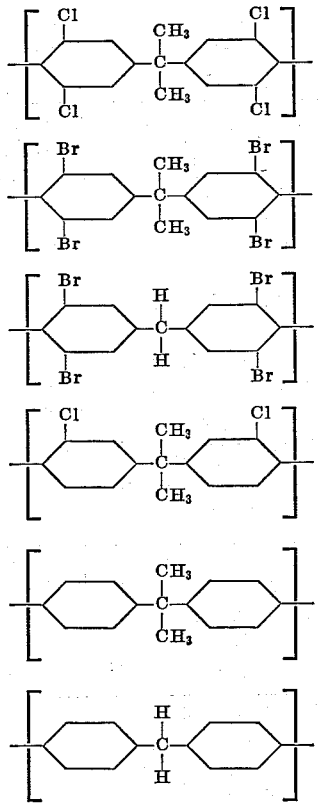

It is to be borne in mind, of course, that at least one of R or R' must be halogenated and the thus halogenated reactant employed in sufficient proportion to provide the required minimum percent by weight of halogen in the end product to impart the property of self extinguishing thereto. It must further be borne in mind that the molar ratio of epoxide to bisphenol must be within the aforesaid ratio of between 0.95 to 1.05 and preferably substantially 1.

The flow sheet set out below is a schematic representation of a continuous mode of making the composition of the invention. It is suggestive of but one mode and is not intended to define limits for carrying out the invention.

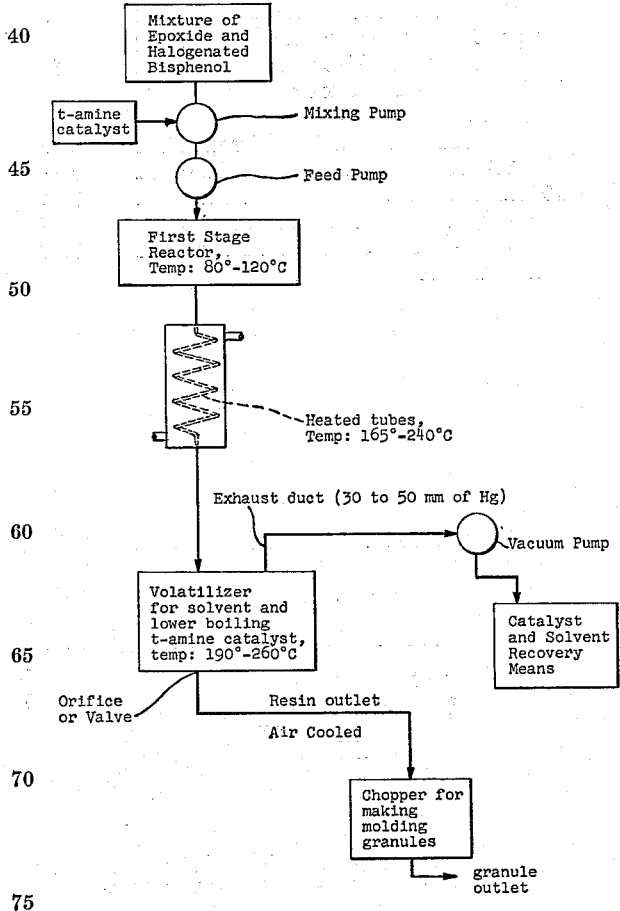

The following examples are illustrative of the practice of the invention:

Example 1

A mixture of 172.5 grams of the diglycidyl ether, 2,2-bis[p-(2,3-epoxypropoxy)phenyl]propane and 183 grams of 4,4'-isopropylidenebis(2,6-dichlorophenol) were placed in a reaction vessel of the type above described and heated at 135° C. while being stirred. This mixture provided substantially equal equivalents of oxirane and hydroxyl groups as shown on the left hand side of the equation above. 2.8 grams of triethylamine were added while stirring. Equal amounts of the material were then poured into three 200 milliliter iron crucibles. The crucibles were placed in an oven, raised to a temperature of 225° C. and held at between 220° and 225° C. for 1 hour and then removed from the oven and allowed to cool to room temperature. The product formed was a clear light-colored thermoplastic polymer having a molecular weight of 61,000. The product was ground through a hammer mill and then molded into sheets of 0.125 inch thickness. Test specimens were cut from the molded sheet.

The product specimens of the invention so made were then subjected to a series of tests to show the more salient physical properties. The properties ascertained by the tests are set out in Table I below.

TABLE I

| Property: | Epoxide polymer |
|---|---|
| Ultimate tensile A.S.T.M. test D638–58T p.s.i. | 8300 |
| Ultimate elongation A.S.T.M. test D638–58T percent | 3.7 |
| Tensile modulus (modulus of elasticity) A.S.T.M. test D638–58T p.s.i. | $4.3 \times 10^5$ |
| Impact resistance at 73° F. A.S.T.M. test D256–56 ft. lb./in. of notch | 1.6 |
| Rockwell hardness number M scale; A.S.T.M. test D785–51 | 53 |
| Dielectric constant at designated cycles per second: | |
| $10^3$ micro-microfarads | 3.73 |
| $10^4$ do | 3.71 |
| $10^5$ do | 3.65 |
| $10^6$ do | 3.65 |
| $5 \times 10^7$ do | 3.37 |
| A.S.T.M. test D150–54T. | |
| Dissipation factor at designated cycles per second: | |
| $10^3$ do | .0020 |
| $10^4$ do | .0054 |
| $10^5$ do | .0135 |
| $10^6$ do | .0240 |
| $5 \times 10^7$ do | .0373 |
| A.S.T.M. test D150–54T. | |
| Heat distortion or deflection temperature. A.S.T.M. test D648–56 ° F. | 196 |
| Light stability by Fade-O-meter color change test. A.S.T.M. recommended practice E 42–57 hours | 100 |
| Molecular weight as described in Number Average Molecular Weight, by Bannar, Dimbbet, and Stross, pages 191–261 | 61,000 |
| Flammability [1] A.S.T.M. test D635–56 | Self-extinguishing |

[1] Laminated resin samples of the invention for use in the flammability test were prepared as follows: Squares of glass cloth (Owens-Corning Type 181–136 satisfying the specification required by the designated A.S.T.M. test) were placed in a 4½" x 4½" x ⅛" window-type mold. The glass cloth was impregnated with the liquid mixture of the diglycidyl ether of bisphenol A, tetrachlorobisphenol A and triethylamine by saturating the cloth with the resin. The mold and contents were then subjected to a temperature of 203° C. and a pressure of 780 p.s.i. was applied to the surface of the resin-impregnated glass cloth for at 0.5 hour to produce resin laminated glass cloth sections. The sections were then removed from the molds and cut into 0.5 inch wide strips which were then subjected to the flammability test designated in Table I.

Reference to Table I shows that the thermoplastic resin of the invention has good elongation and modulus as well as high tensile strength properties, high molecular weight, and good electrical insulating properties, and is self-extinguishing.

To show the effect of varying the molar ratio and thereby the equivalents of oxirane groups to phenolic hydroxyls and also of varying the percent of amine catalyst present, the Examples 2 to 6 of the invention and comparative Runs A and B were made. The procedure employed was substantially the same as that of Example 1 above. The epoxide employed was the diglycidyl ether of bisphenol A having an average epoxide equivalent weight of 172.4 except that of Example 5 wherein the average epoxide equivalent weight was 188. The bisphenol employed was tetrachlorobisphenol A. The catalyst was tri-n-butylamine. The equivalents of epoxide and phenolic hydroxyls and percent by weight of amine employed, as well as outstanding characteristics of the resin so made, are shown in Table II below.

TABLE II

| Run Number | Equivalents Epoxide [1] | Equivalents Phenolic OH [2] | Catalyst [3] Concentration, Percent | Reaction Temp., °C. | Reaction Time, hr. | Tensile Strength | Percent Elongation |
|---|---|---|---|---|---|---|---|
| Example 2 | 1.0 | 1.0 | 1.0 | 215 | 1 | 10,650 | 8.5 |
| Comparative Run A | 1.0 | 0.9 | 1.0 | 215 | 1 | Too brittle to test | |
| Comparative Run B | 1.0 | 1.1 | 1.0 | 215 | 1 | Too brittle to test | |
| Example 3 | 1.0 | 1.035 | 1.0 | 215 | 1 | 8,550 | 6.2 |
| Example 4 | 1.0 | 0.96 | 1.0 | 215 | 1 | 8,300 | 4.8 |
| Example 5 | 1.0 | 1.0 | 1.0 | 215 | 1 | 7,400 | 4.4 |
| Example 6 | 1.0 | 1.0 | 0.4 | 215 | [4] 3 | 7,100 | [5] 5.0 |

[1] The diglycidyl ether of bisphenol A.
[2] Tetrachlorobisphenol A.
[3] Tri-n-butylamine, by weight.
[4] Because of reduced catalyst, a longer reaction time was required.
[5] All resins made were self extinguishing.

Reference to Table II shows that the best results are obtained when equivalents of oxirane groups and phenolic hydroxyl groups are employed, but that acceptable results are obtained when the ratio of oxirane groups to phenolic hydroxyls varies from 0.96 to 1.035. Examination of the resin samples indicate that the acceptable molar ratio of oxirane to phenolic hydroxyl groups is from 0.95 to 1.05. However, as shown by comparative Runs A and B, when the molar ratio of oxirane to hydroxyl groups is as low as 0.9 or as high as 1.1, the resulting resin is too brittle to be acceptable.

The moplastic resins, made according to the procedure employed in the examples shown in Table II, were placed in an injection molding chamber connected to a 3/16" by 1/8" (about 0.0234 square inch cross-section) spiral mold. The resin was heated to 450° F. and a measured pressure applied to force the resin into the spiral mold a distance of about 22 inches. The procedure was repeated using a second spiral mold of the same dimensions as the first, but heating the resin to 475° F. The same pressure forced the resin into the mold a distance of about 26 inches. The procedure was again repeated using a third mold of the same type, but heating the resin to 500° F. The same pressure forced the resin into the mold a distance of 32 inches. The molded spirals were cooled, removed from the molds and examined. They were strong, flexible and uniform, had a clear surface and were transparent, thereby evincing the suitability of the resin of the invention for injection molding.

To show the result of employing various mixtures of tetrabromobisphenol A and tetrachlorobisphenol A with the diglycidyl ether of bisphenol A, examples 7 to 10 were run. In these examples, the weights of tetrabromobisphenol A, tetrachlorobisphenol A, and the diglycidyl ether, in the amounts shown in Table II, were mixed at a temperature of about 125° C. in a reaction kettle. The mixture so made was then cooled to about 110° C. and 1.1 grams of triethylamine admixed therewith. The mixture was then heated to about 150° C. for a few minutes, to effect a partial reaction and to increase the viscosity, and then transferred to 7½" x 7½" x 1/8" molds, platens placed thereon, and the mixture heated to 232° C. for one hour, during the last five minutes of which a force of 32 tons per mold or about 0.57 ton pressure per square inch was applied to the platen to impart smooth glassy surfaces to the molded resin sheets. Samples of the resin thus made were then subjected to the tensile, elongation, and impact tests identified in Table I. The results are shown in Table III below.

TABLE III

| Example No. | Grams of diglycidyl ether of bisphenol A | Grams of tetrachlorobisphenol A | Grams of tetrabromobisphenol A | Grams of triethylamine | Tensile strength in p.s.i. | Elongation in percent | Impact strength in foot pounds per inch of notch |
|---|---|---|---|---|---|---|---|
| 7 | 70 | 66.0 | 10.8 | 1.1 | 9,120 | 13.0 | 3.68 |
| 8 | 70 | 58.5 | 21.6 | 1.1 | 9,300 | 8.6 | 0.62 |
| 9 | 70 | 69.5 | 5.4 | 1.1 | 9,360 | 13.3 | 1.46 |
| 10 | 70 | 72.5 | 1.0 | 1.1 | 8,945 | 16.4 | 4.00 |

Epoxide equivalent weight was 173–179.

Reference to Table III shows that a resin, having good physical properties, results when employing mixed halobisphenols with a diglycidyl ether in the practice of the invention. All the resin samples made contained an ample number of halogens attached to aromatic nuclei to insure their being self extinguishing.

It is, therefore, shown that mixtures of chlorinated and brominated bisphenols may be employed with a diglycidyl ether of a polyhydric phenol so long as the resulting resin possesses sufficient total halogen content to be self extinguishing. For purposes of easy reference, Table IV is set forth showing the lowest percents of bromine and chlorine, in mixed halogenated bisphenols, necessary in the resin, based on the weight of the resin, to insure that it be self extinguishing.

TABLE IV

| Percent Bromine | Percent Chlorine |
|---|---|
| 10.5 | 0 |
| 10.0 | 0.8 |
| 9.5 | 1.7 |
| 9.0 | 2.6 |
| 8.5 | 3.5 |
| 8 | 4.4 |
| 7.5 | 5.3 |
| 7.0 | 6.2 |
| 6.5 | 7.1 |
| 6.0 | 8.0 |
| 5.5 | 8.9 |
| 5.0 | 9.8 |
| 4.5 | 10.7 |
| 4.0 | 11.8 |
| 3.5 | 12.7 |
| 3.0 | 13.6 |
| 2.5 | 14.5 |
| 2.0 | 15.3 |
| 1.5 | 16.2 |
| 1.0 | 18.1 |
| .5 | 19.0 |
| 0 | |

Additional examples were run to show the improved strength properties which result from employing an especially pure diglycidyl ether. These examples also illustrate the use of higher molecular weight tertiary amines as catalysts. The diglycidyl ether employed in known as a "low-chlorine" diepoxide resin. It was the same as that employed in the previous examples except that substantially all residual chlorine from the epichlorohydrin (which sometimes runs as high as about 0.4% by weight of the final product) had been removed. The results are set out in Table V below.

TABLE V

| Example No. | Grams of low-chlorine diglycidyl ether of bisphenol A | Grams of tetrachlorobisphenol A | Grams of amine catalyst | Tensile Strength in p.s.i. | Elongation in percent | Impact in foot pounds per inch of notch |
|---|---|---|---|---|---|---|
| 11 | 69 | 73.2 | 2.15 tri-n-butylamine | 10,500 | 11.9 | 1.84 |
| 12 | 69 | 73.2 | 1.65 tri-n-propylamine | 10,200 | 7.4 | 2.00 |
| 13 | 69 | 73.2 | 2.6 tri-iso-amylamine | 10,400 | 7.8 | 1.4 |

Reference to Table V shows that the physical properties are improved by employing a purified diglycidyl ether. The table also shows that various tertiary amines may be employed to produce the high strength self extinguishing thermoplastic resin of the invention.

Having described the invention, what is claimed and desired to be protected by Letters Patent is:

1. A moldable thermoplastic self-extinguishing solid resin composition, having a tensile strength of at least about 7000 pounds per square inch, a percent elongation of at least about 3.5, a tensile modulus of at least about $4.0 \times 10^5$ pounds per square inch, an impact resistance of at least about 1.5 foot pounds per inch of notch, a Rockwell hardness of at least about 50, a dielectric constant at 10.5 cycles per second of at least about 3.5 micro-microfarads, a heat distortion temperature of at least about 190° F., and a molecular weight of at least about 30,000, which consists essentially of the reaction product of (1) a diglycidyl ether having an average of about two terminal oxirane groups per molecule, prepared by reacting epichlorohydrin with an hydroxy compound selected from the class consisting of 4,4'-isoalkylidenebis(2,6-dibromophenol),
4,4'-isoalkylidenebis(2,6-dichlorophenol),
4,4'-methylenebis(2,6-dibromophenol),
4,4'-isoalkylidenebis(bromophenol),
4,4'-methylenebis(2,6-dichlorophenol),
4,4'-methylene-bis(2,6-dibromophenol),
4,4'-methylenebisdiphenol, and
4,4'-isoalkylidenediphenol and (2) a bisphenolic compound selected from the class consisting of 4,4'-isolakylidenebis(2,6-dibromophenol),
4,4'-isoalkylidene(2,6-dichlorophenol),
4,4'-isoalkylidenebis(chlorophenol),
4,4'-isoalkylidenebis(bromophenol),
4,4'-methylenebis(2,6-dichlorophenol),
4,4'-methylenebis(2,6-dibromophenol),
4,4'-methylenebisdiphenol, and
4,4'-isoalkylidenediphenol, in a ratio of between 0.95 and 1.05 moles of the diepoxide ether per mole of the bisphenolic compound, at least one of the diepoxide ether and bisphenolic reactants containing halogen substituents selected from the class consisting of bromine and chlorine attached directly to carbon atoms of the aromatic nuclei, such halogen substituent being present in an amount sufficient to provide at least 10.5 percent of bromine, when bromine is the halogen, and at least 19.0 percent of chlorine, when chlorine is the halogen, based on the weight of said composition, in the presence of (3) a tertiary amine catalyst, in an amount sufficient to provide at least 0.02 percent nitrogen, by weight of said composition, added as $NR_3$ wherein each R is an alkyl substituent containing between two and six carbon atoms.

2. The method of making a thermoplastic self-extinguishing flexible solid resin composition of high molecular weight and high tensile strength which consists essentially of the steps of admixing an alkyl tertiary amine catalyst having from 2 to 6 carbon atoms in each alkyl substituent in an amount sufficient to provide at least 0.02 percent nitrogen by weight of said composition, with a mixture of a diglycidyl ether of a dihydric phenol and a halogenated polyhydric phenol, the halogen substituent thereof being selected from the class consisting of bromine and chlorine in an amount sufficient to provide a total of at least 10.5 percent bromine, when bromine is said substituent, and a total of at least 19.0 percent chlorine, when chlorine is said substituent, based on the weight of said composition, in a ratio of between 0.95 and 1.05 moles of said epoxide ether per mole of said phenol, subjecting the mixture thus made to a temperature of between 80° and 120° C. for at least about 0.25 hour, then subjecting the thus heated mixture to a temperature of between about 165° and 240° C. for an additional period of at least about 0.5 hour, and thereafter passing the thus heated reaction mixture into a vented vessel which is maintained at a temperature of between about 190° and 260° C. and drawing off from the bottom of said vented vessel the thermoplastic resinous product.

3. The method according to claim 2 wherein the thermoplastic resinous product is drawn off through a narrow horizontally elongated die to form a film of said product and cooling the film so made to below 90° C.

4. The method according to claim 2 wherein the thermoplastic resinous product is drawn off through an orifice to form strands of said product and cooling the strands so formed to below 90° C.

5. The method according to claim 4 wherein said strands, subsequent to cooling, are particulated to form granules suitable for use in film forming, injection molding, compression molding, and extruding.

6. The composition of claim 1 wherein the bisphenolic compound is 4,4'-isopropylidenebis(2,6-dibromophenol).

7. The composition of claim 1 wherein the bisphenolic compound is 4,4'-isopropylidenebis(2,6-dichlorophenol).

8. The composition of claim 1 wherein the diepoxide ether is the diglycidyl ether of 4,4'-isopropylidenediphenol.

References Cited by the Examiner

UNITED STATES PATENTS

| 2,451,986 | 10/1948 | Slaughter | 18—55 |
| 2,467,171 | 4/1949 | Werner et al. | 260—348 |
| 2,602,075 | 7/1952 | Carpenter et al. | 260—47 |
| 2,837,497 | 6/1958 | Delmonte | 260—47 |
| 3,004,951 | 10/1961 | Dazzi | 260—47 |
| 3,016,362 | 1/1962 | Wismer | 260—47 |
| 3,074,974 | 1/1963 | Gebura | 260—47 |

OTHER REFERENCES

Lee et al., "Epoxy Resins" pages 35–41 relied on, July 1957.

Hackh's Chemical Dictionary, 3rd Ed., 1944, published by McGraw-Hill Book Co. (page 310 relied on).

Zaehringer, "Solid Propellant Rockets," 1958; published by American Rocket Co., Box 1112, Wyandotte, Mich. (pages 209, 210, 211, 212, 213, 214 and 215 relied on).

WILLIAM H. SHORT, *Primary Examiner.*

HAROLD N. BURSTEIN, *Examiner.*

T. D. KERWIN, A. L. LIBERMAN,
*Assistant Examiners.*